July 8, 1941.  H. J. FANGER  2,248,070
WELDING TRANSFORMER
Filed July 5, 1933
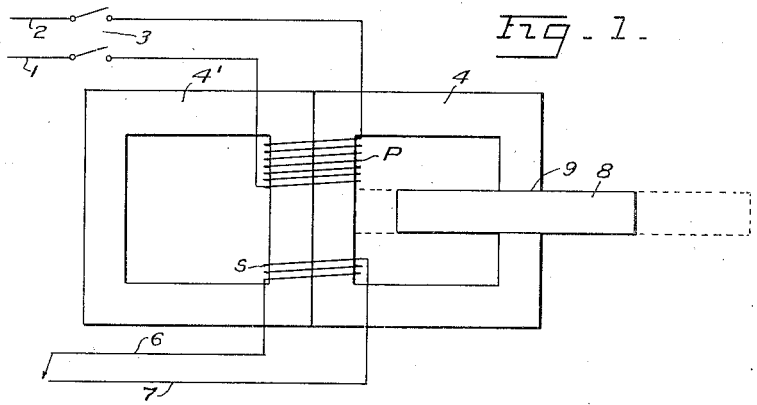
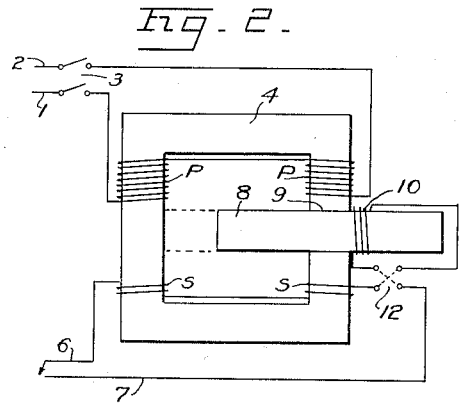
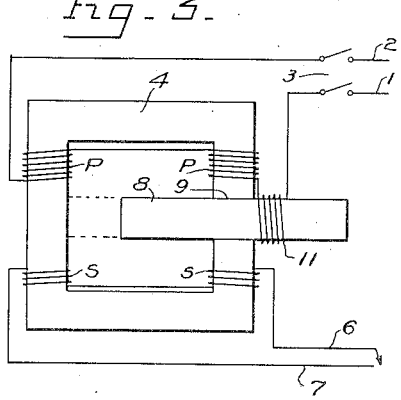
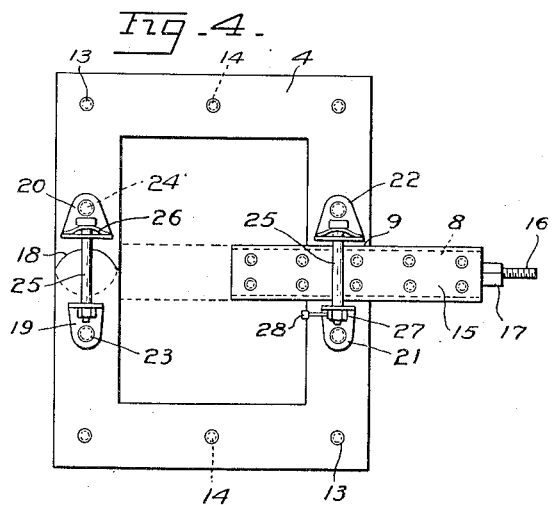
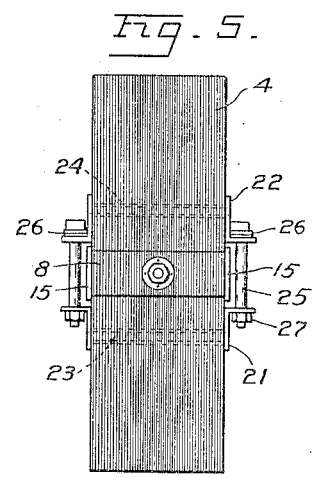
INVENTOR.
HERMAN J. FANGER
BY
ATTORNEY.

Patented July 8, 1941

2,248,070

UNITED STATES PATENT OFFICE 2,248,070

WELDING TRANSFORMER

Herman J. Fanger, Oakland, Calif., assignor to George G. Glenn, Oakland, Calif.

Application July 5, 1938, Serial No. 217,364

14 Claims. (Cl. 171—119)

This invention relates to alternating current transformers as used for reduction of voltage in electric welding, and the principal object of the invention is to provide improved construction in such transformers whereby the characteristics of the welding current will be more suitable for the purpose intended and the apparatus, especially when used for spot welding will to a great extent automatically adjust itself to the requirements, and also provide for simple manual control when desired.

A particular feature of the invention is the provision of a transformer of the character mentioned in which there is means for shunting more or less the magnetic flux, taking the form of a movable core section so arranged that it always forms part of the main path of the flux through the core.

Another feature is the use of a winding on or adjacent the shunt core, which is in series with either the secondary, or the primary, winding and whereby an opposition of some undetermined nature is set up which contributes to the effects desired in the welding circuit.

Other features and advantages of the invention will appear in the following description and accompanying drawing.

In the drawing:

Figure 1 is a diagrammatic drawing showing the elements and circuits of the improved transformer arranged in a manner particularly adapted for use in spot welding, or resistance welding.

Figure 2 is a diagrammatic showing of the elements and circuits of the improved transformer as more suited for arc welding and showing a coil on the shunt core in series with the secondary windings.

Figure 3 is a diagram similar to that of Figure 2 but showing a coil on the shunt core in series with the primary windings.

Figure 4 is a side view of the transformer core and its magnetic shunt section to illustrate the mechanical construction employed to carry out the invention.

Figure 5 is an end view of the core shown in Figure 4.

Before describing the drawing in more detail, it may be stated that the main feature of the invention is the provision in a ring-type iron core of a welding transformer, of a separate core section slidable through a gap cut in one leg of the transformer to more or less shunt the magnetic flux depending on the degree the shunt core section is pushed in toward the opposite leg of the transformer, the shunt core section being a snug fit in the gap and with its laminations in edgewise abutting relation to the main core laminations so as to always form a part of the main path of the flux in the core, whether the section is pushed in or pulled out as far as it will go.

In the transformer as arranged for arc welding where the greatest degree of control is required, the movable core section is also provided with a coil or winding preferably surrounding it and through which it slides, this coil being in series with either the secondary or the primary windings of the transformer, and which coil is preferably connected in the circuit with a reversing switch so that the direction of the current passing through it may be controlled for best effects in some cases.

In the drawing the alternating line current wires are indicated at 1, 2, the line switch 3, the transformer ring type laminated core 4, the primary windings P, secondary windings S, welding terminal wires 6, 7, the sliding or shunt core section 8 smoothly slidable back and forth in the gap 9 cut through one leg of the core, and the auxiliary or shunt core winding is designated 10 in Figure 2, and 11 in Figure 3. In Figure 2 the shunt core coil 10 is in series with the secondary windings and is connected by way of a reversing switch 12.

In the showing of Figure 1 the laminated transformer core is of the double ring or figure 8 type with the shunt core section slidable through one loop or ring 4 only of the core, and leaving the other ring 4' unshunted, as this has been found to give sufficient control for spot welding purposes. With such a transformer designed for 110 v. A. C. primary and 6 to 8 v. output in the secondary of about 20,000 amps., the voltage will drop to about ½ v. or less upon closing the spot welding circuit. Pushing the slide core in will drop the output amperage from about 20,000 to about 500 or less, without any reactance used in the primary circuit.

In the construction shown in Figures 2 and 3 the core is of the laminated single rectangular ring type with both the primary and secondary windings arranged on both legs of the core, and while the windings are here shown respectively in series, either or both may be in parallel, depending on the line voltage and the welding current required, such welding currents generally being of about 60 to 68 open voltage, and from about 15 to 200 amps., and dropping to 38 or 40 volts at working arc.

In both Figures 2 and 3 the auxiliary winding 10 or 11 is shown surrounding the slidable core section 8 and positioned adjacent the main core so that the slidable core section can slide back and forth through it to more or less shunt the flux away from passing through the secondary windings.

The reversing switch 12 shown in Figure 2 may also be used for the coil 11 of Figure 3, which is in series with the primary windings.

When the transformer as above described is adjusted for the maximum amperage in the welding circuit by sliding the core section in as may be required, the current becomes to a great extent self-adjusting to meet the various conditions of either spot welding, or arc welding to such an extent that spot welding of iron plates from about ⅜ of an inch thick all the way down to the welding of a couple of 1/16" diameter wires together in crossed position, requires no adjusting.

With arc welding, infinite control of the volume of the secondary current, between maximum and minimum is obtained by adjustment of the slidable shunt core without altering the welding characteristics of the current, also better ignition of the arc is had at a given voltage, and greater stability of the arc, as well as a very high electrical efficiency, running from about 80.6% to about 94%.

The exact reason for the current steadying and controlling action of the transformer is not understood, but it appears due to opposing flux forces and/or counter-electromotive force especially when the shunt winding is used, and with a further result that the wave characteristic of the welding current as observed in the oscillograph shows the tops of the sine curves almost flattened out and broadened, and with an almost abrupt and instantaneous passing from maximum of one potential to maximum of the opposite potential.

In some welding jobs the apparatus gives better results when the current passes through the shunt coil in the one direction of its winding, while in other cases the opposite holds true, and I preferably provide a reversing switch for this coil, as indicated at 12 in Figure 2. It appears to make no great difference in the result whether the shunt coil is energized from the primary or secondary circuits.

While I prefer to have the auxiliary winding 10 or 11 fixed and the shunt core slidable through it, to get the best effects, still it may be made to move with the sliding core, or be placed adjacent the movable core without surrounding it, when the best effects are not required.

In actual construction the shunt core section is made of laminated iron the same as is the main core and with the laminations extending in the same plane so that they are in edge contact with the core laminations when in sliding position. The gap and the core section are accurately machined and finished so that perfect sliding contact will exist at all points, and means is provided to resiliently urge the gap to close snugly against the slidable core so as to assure good magnetic contact.

In Figures 4 and 5 some the principal details of construction are set out. The laminated plates of the core 4 are insulatingly prepared in the usual manner, and are secured together as by brass or insulated bolts or rivets 13 in insulating tubes 14, and the same construction applies to the sliding core section 8 except that it is sheathed in opposite sides with a somewhat wider plate of Bakelite or other insulating material 15 which overlaps the margins of the core gap 9 to insure proper guidance of the section in sliding, and the outer end of the section is preferably provided with an extending threaded rod 16 with which the section may be moved back and forth, either by turning the rod in a suitable nut 17 secured to the end of the section, and with the rod passing freely in a hole in the section, or by turning a nut on the rod rotatable on a fixed support not shown. For simple, inexpensive construction, however, the section may be adjusted manually, and suitable calibration marks may be formed along one edge to aid in resetting to any particular value.

To insure a smooth, snug fit of the slidable section in the gap, I preferably provide a circular joint through all of the core segments at 18, staggered to overlap in the successive laminations, and then hold both this joint as well as the joint between the gap and the slidable section closed by spring tension applied in any desired manner.

A convenient way of applying the spring tension to the joints is to provide a pair of angle plates 19, 20—21, 22, in confronting relation on opposite sides of both joints, and on opposite sides of the stack of core laminations, and the angle plates held in place by brass bolts or rivets 23 passing through insulating tubes or sleeves 24, and each pair of confronting plates resiliently drawn toward one another by spring bolts, such as the bolts 25 with their heads resting on slightly arched spring plates 26 on one of the angle plates, or there may be such a spring plate at both ends of the bolt. This construction provides a tight joint with just enough friction to make it possible to slide the shunt core section 8 as may be required, though provision may be made to loosen the joint slightly as by relaxing the bolts a trifle, to slide the core, and tighten them afterward. Such a provision may take several different forms, such as by means of a cam or wedge under the head or nut of the bolt, or making the ends of the bolts 23 eccentric so they can be turned, or by having a relatively quick or coarse thread on the bolts 25 and providing a small lever projecting from the nuts 27 as indicated at 28 which may be given a half turn to release the bolts sufficiently to permit the core section to slide more easily. This provision for releasing the spring tension on the bolts would only be desirable on the gap joint, as the other one at 18 hardly affects the slidability of the core section. In my appended claims the words "ring core, or ring-type core" are to be taken as including any transformer core of magnetic material in the general form of a ring, or square or oblong loop, or double loop, or of figure 8 form, in any of which cores there would normally be a closed complete magnetic path for the magnetic flux, were it free of the gap further set out in the claims and in which gap my movable shunt core operates, while at all times filling and closing said gap.

Having thus described my invention and some of its modifications, what I claim is:

1. A welding transformer comprising a ring-type core with a gap at one point in the ring, a separate movable elongated shunt core section slidably positioned in said gap and movable therein adjacent to and from a point on the ring-type core opposite said gap, said core section being of a length to fill said gap at all points of operative movement so as to maintain a closed path for magnetic flux through said ring-type core at all times, and primary and secondary electric windings on said ring-type core respectively positioned at opposite sides of the plane of movement of said core section proportioned to yield a welding current output from the secondary windings.

2. In a welding transformer construction, as set out in claim 1, said ring-type core formed of laminated iron with plates arranged in the plane of the ring, and said shunt core section also formed of laminated iron with its platess extending in the same plane as those of said ring-type core and in slidable edgewise contact therewith at both sides of said gap.

3. In an electrical transformer of the character described, a ring-type core formed with a joint intermediate one leg and a gap in the leg opposite said joint, a shunt core section slidably positioned in said gap for moving toward and from said joint while always filling said gap, and means resiliently urging the gap to snugly embrace said shunt core section.

4. In an electrical transformer of the character described, a ring-type core formed with a joint intermediate one leg and a gap in the leg opposite said joint, a shunt core section slidably positioned in said gap for moving toward and from said joint while always filling said gap, and means resiliently urging the gap to snugly embrace said shunt core section, and means resiliently urging the core members at opposite sides of said joint into close contact.

5. In a construction as set out in claim 4, the means resiliently urging the gap and joint core members together comprising brackets secured to the core at opposite sides of the joint and the gap, and spring means urging the brackets toward one another.

6. In a construction as set out in claim 4, the means resiliently urging the gap and joint core members together comprising brackets secured to the core at opposite sides of the joint and the gap, and spring means urging the brackets toward one another, and means for relieving the tension of said spring means, to facilitate sliding of said shunt core section.

7. In a construction as set out in claim 3, said joint formed of staggered socket ends formed on the core laminations.

8. A welding transformer comprising a primary and secondary electric windings proportioned to yield a welding current output from the secondary winding, an iron core having a plurality of legs forming a closed ring-type core and carrying said windings, one of said legs formed at an intermediate point with a through gap with confronting walls, a separate iron shunt core section filling said gap and slidably positioned therein, said shunt core section being of a length for sliding in said gap to move the inner end of said shunt core adjacent to and from a point on the opposite leg of said ring-type core to more or less shunt the normal path of the flux to said opposite leg, said primary and secondary windings positioned on said ring-type core respectively at opposite sides of the plane of movement of said shunt core section, and said shunt core section being of a size to always fill said gap at all positions of use, and means for resiliently clamping the shunt core section between the confronting walls of the gap.

9. In a welding transformer as set out in claim 1, a separate winding adjacent said movable core section in series with one of the transformer windings.

10. In a welding transformer as set out in claim 1, a separate winding adjacent said movable core section in series with the primary transformer windings.

11. In a welding transformer as set out in caim 1, a separate winding adjacent said movable core section in series with the secondary transformer windings.

12. In a welding transformer as set out in claim 1, a separate winding adjacent said movable core section in series with one of the transformer windings and connected into the circuit through a reversing switch.

13. In a welding transformer construction as set out in claim 1, means co-operating with the movable shunt core section and the margins of said gap guiding the section for sliding through the gap.

14. In a welding transformer construction as set out in claim 1, means co-operating with the movable shunt core section and the margins of said gap guiding the section for sliding through the gap comprising a pair of plates on the outer sides of said shunt core section overlapping the margins of said gap.

HERMAN J. FANGER.